US011119722B2

(12) United States Patent
Tanaka

(10) Patent No.: US 11,119,722 B2
(45) Date of Patent: Sep. 14, 2021

(54) MOVABLE BODY CONTROL APPARATUS AND RECORDING MEDIUM

(71) Applicant: SHARP KABUSHIKI KAISHA, Sakai (JP)

(72) Inventor: Shinji Tanaka, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 84 days.

(21) Appl. No.: 16/343,727

(22) PCT Filed: Aug. 10, 2017

(86) PCT No.: PCT/JP2017/029022
§ 371 (c)(1),
(2) Date: Apr. 19, 2019

(87) PCT Pub. No.: WO2018/087971
PCT Pub. Date: May 17, 2018

(65) Prior Publication Data
US 2019/0272143 A1 Sep. 5, 2019

(30) Foreign Application Priority Data
Nov. 8, 2016 (JP) .............................. JP2016-218446

(51) Int. Cl.
*G06F 3/16* (2006.01)
*G10L 13/08* (2013.01)
(Continued)

(52) U.S. Cl.
CPC .................. *G06F 3/16* (2013.01); *G06F 3/01* (2013.01); *G10L 13/00* (2013.01); *G10L 13/08* (2013.01); *G10L 2015/0631* (2013.01)

(58) Field of Classification Search
CPC ... G06F 3/16; G06F 3/01; G10L 13/00; G10L 13/08; G10L 2015/0631; B25J 13/08; B25J 11/0005; B25J 19/023; B25J 5/00
(Continued)

(56) References Cited

U.S. PATENT DOCUMENTS 9,855,658 B2 * 1/2018 Babu ...................... B25J 9/1694
10,678,398 B2 * 6/2020 Anderson ........... G06F 3/04817
(Continued)

FOREIGN PATENT DOCUMENTS

CN 105856243 A 8/2016
JP 2004-109323 A 4/2004
(Continued)

OTHER PUBLICATIONS

"Catching flying balls and preparing coffee", XP054978883; Institute of Robotics and Mechatronics German Aerospace Center; URL;https://www.youtube.com/watch?v=u3vt9t3VSKs.

*Primary Examiner* — Edwin S Leland, III
(74) *Attorney, Agent, or Firm* — ScienBiziP, P.C.

(57) ABSTRACT

An embodiment of the present invention controls a mobile body device to carry out a natural action. A mobile body control device (1) includes: an image acquiring section (21) configured to acquire an image of a surrounding environment of a specific mobile body device; and a control section (2) which is configured to (i) refer to the image and infer, in accordance with the image, a scene in which the specific mobile body device is located, (ii) determine an action in accordance with the scene inferred, and (iii) control the mobile body device to carry out the action determined.

16 Claims, 10 Drawing Sheets

(51) Int. Cl.
*G10L 13/00* (2006.01)
*G06F 3/01* (2006.01)
*G10L 15/06* (2013.01)

(58) Field of Classification Search
USPC .......................................................... 704/201
See application file for complete search history.

(56) References Cited

U.S. PATENT DOCUMENTS

| | | | | |
|---|---|---|---|---|
| 2004/0006483 | A1* | 1/2004 | Sasaki | G10L 15/22 704/277 |
| 2010/0205541 | A1* | 8/2010 | Rapaport | G06F 16/285 715/753 |
| 2011/0134204 | A1* | 6/2011 | Rodriguez | G06Q 10/10 348/14.03 |
| 2013/0218339 | A1* | 8/2013 | Maisonnier | B25J 13/003 700/257 |
| 2015/0209664 | A1* | 7/2015 | Haseltine | G06F 3/011 463/31 |
| 2015/0268717 | A1 | 9/2015 | Schlumberger et al. | |
| 2015/0306496 | A1* | 10/2015 | Haseltine | G06F 3/011 463/31 |
| 2015/0347853 | A1* | 12/2015 | Hwang | G06K 9/00664 348/135 |
| 2016/0026871 | A1* | 1/2016 | Wexler | H04N 7/183 382/103 |
| 2017/0323158 | A1* | 11/2017 | Gordon | G06Q 30/06 |
| 2019/0272143 | A1* | 9/2019 | Tanaka | B25J 11/0005 |

FOREIGN PATENT DOCUMENTS

| | | |
|---|---|---|
| JP | 2004-227276 A | 8/2004 |
| JP | 2007-150681 A | 6/2007 |
| JP | 2016-502694 A | 1/2016 |
| WO | 2009/076203 A1 | 6/2009 |
| WO | 2014/055924 A1 | 4/2014 |

* cited by examiner

MOVABLE BODY CONTROL APPARATUS AND RECORDING MEDIUM

TECHNICAL FIELD

An aspect of the present invention relates to a mobile body control device and a recording medium.

BACKGROUND ART

In recent years, devices having artificial intelligence have been actively developed. For example, Patent Document 1 discloses a voice conversation device which, when asked a question by a user and does not know the answer, asks the user for the answer. The device then stores the question and the answer, and uses the question and answer thus stored in subsequent conversations.

CITATION LIST

Patent Literature

[Patent Literature 1]
Japanese Patent Application Publication, Tokukai, No. 2004-109323 (Publication Date: Apr. 8, 2004)

SUMMARY OF INVENTION

Technical Problem

However, in the prior art, there has been insufficient investigation into controlling a device to carry out actions (e.g., spontaneous speech) other than conversation more naturally. Therefore, the authors of the present invention have, from a unique perspective, carried out diligent study of techniques for controlling a mobile body device to carry out more natural actions even in situations other than conversation.

An aspect of the present invention has been made in view of the above problem. It is a primary object of an aspect of the present invention to provide a mobile body control device and a mobile body control program, each of which makes it possible to control a mobile body device to carry out more natural actions even in situations other than conversation.

Solution to Problem

In order to solve the above problem, a mobile body control device in accordance with an aspect of the present invention is a mobile body control device including: an image acquiring section; an action control section; and one or more processors, the image acquiring section being configured to acquire an image of a surrounding environment of a specific mobile body device, the one or more processors being configured to carry out: scene inference processing in which the one or more processors refer to the image acquired by the image acquiring section and infer, in accordance with the image, a scene in which the specific mobile body device is located; action determination processing in which the one or more processors determine an action, in accordance with the scene inferred, to be carried out; and action control processing in which the one or more processors control the specific mobile body device to carry out the action determined.

Advantageous Effects of Invention

An aspect of the present invention makes it possible to infer a scene in which a specific mobile body device is located and control the specific mobile body device to carry out an action in accordance with the scene in which the mobile body device is located.

DESCRIPTION OF EMBODIMENTS

Embodiment 1

The following description will discuss Embodiment 1 of the present invention in detail.

(Configuration of Main Parts of Mobile Body Control Device 1)

Figure 1:
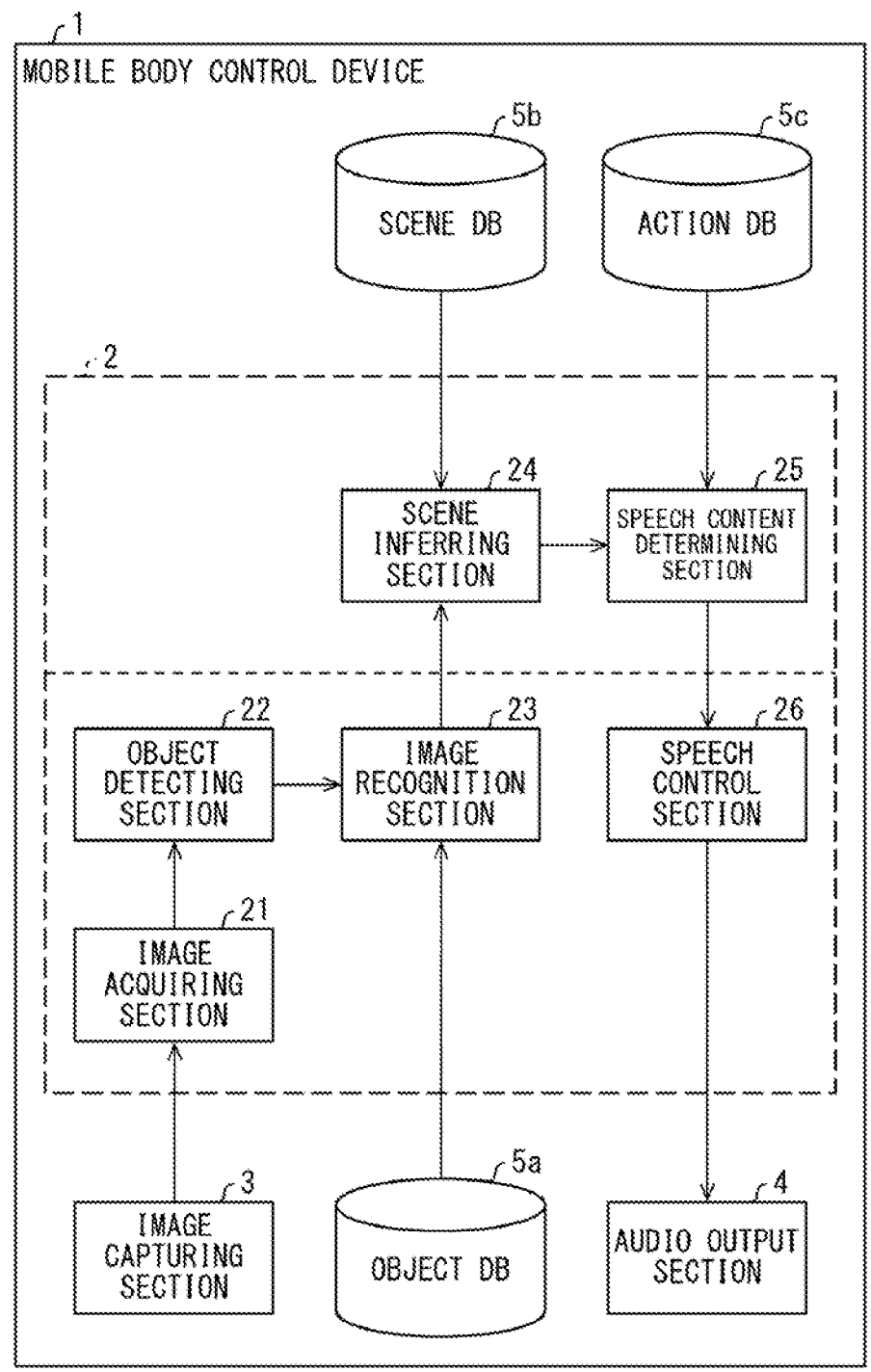
FIG. 1 is a block diagram illustrating a configuration of main parts of a mobile body control device in accordance with Embodiment 1 of the present invention.

FIG. 1 is a block diagram illustrating a configuration of main parts of a mobile body control device 1 in accordance with Embodiment 1. As shown in FIG. 1, the mobile body control device 1 includes a control section (processor) 2, an image capturing section 3, an audio output section 4, an object database ("database" hereinafter abbreviated as "DB") 5a, a scene DB (association information storage section) 5b, and an action DB (second association information storage section) 5c.

Each of the control section 2, the image capturing section 3, the audio output section 4, the object DB 5a, the scene DB 5b, and the action DB 5c may be constituted by a single piece of hardware, or may be constituted by a plurality of pieces of hardware in a decentralized manner.

The control section 2 includes, as functional blocks, an image acquiring section 21, an object detecting section 22, an image recognition section 23, a scene inferring section 24, a speech content determining section (action determination section) 25, and a speech control section (action control section) 26. The control section 2 is constituted by one or more processors. The control section 2 may be configured such that one processor executes processes of all functional blocks, or such that a plurality of processors divide between them the processes of respective functional blocks.

The image capturing section 3 may be, for example, one or more cameras. The image capturing section 3 captures an image of a surrounding environment of a specific mobile body device. The image acquiring section 21 acquires, via the image capturing section 3, the captured image of the surrounding environment of the specific mobile body device. The image acquiring section 21 may be configured to acquire a single captured image, or may be configured to acquire a plurality of captured images. In a case where the image acquiring section 21 is configured to acquire a plurality of captured images, one of the following configurations may be employed: (i) the image capturing section 3 includes a plurality of cameras that capture images in different directions, and the image acquiring section 21 acquires the captured image from each camera; (ii) the image capturing section 3 includes a camera that can be moved (including rotational movement), and the image acquiring section 21 acquires a plurality of captured images as the camera is moved or as the orientation of the camera is changed. This makes it possible to for the image acquiring section 21 to acquire a suitable captured image of the surrounding environment of the specific mobile body device.

The object detecting section 22 detects an object appearing in the captured image acquired by the image acquiring section 21 (for example, in a case where the mobile body device is in a house, the object detecting section 22 may detect a television, a sofa, a table, etc.) (this detection being part of scene inference processing). More specifically, the object detecting section 22 identifies an area in the captured image in which there is a possibility that an object is shown, and cuts out the area so as to generate detected image data. In a case where the captured image includes a plurality of areas in which there is a possibility that an object is shown, the object detecting section 22 identifies the plurality of areas and generates a plurality of pieces of detected image data.

The image recognition section 23 refers to the object DB 5a and identifies, for example, the name or ID of the object detected by the object detecting section 22, on the basis of the detected image data generated by the object detecting section 22 (part of scene inference processing). The object DB 5a stores, in advance, information used for identifying the name, ID, or the like of each object. For example, the object DB 5a stores, in advance, (i) parameters for ascertaining a feature of the detected image data, and (ii) information for converting a plurality of features into a name, ID, or the like of each object.

The scene inferring section 24 refers to the scene DB 5b and infers a scene in which the specific mobile body device is located, based on a combination of names, IDs, or the like of objects identified by the image recognition section 23 (scene inference processing). As used herein, the term "scene in which the mobile body device is located" refers to the type of the location in which the mobile body device is situated. For example, in a case where the mobile body device is in a house, the scene may be a room such as a living room, a bedroom, a kitchen, etc. The scene DB 5b stores, in advance, association information which indicates an association between each object and each scene. More specifically, for example, the scene DB 5b stores in advance the names, IDs, or the like of objects which are likely to exist in each scene, in association with that scene.

The speech content determining section 25 refers to the action DB 5c and determines speech content in accordance with the scene inferred by the scene inferring section 24 (action determination processing). The action DB 5c stores in advance information which stipulates a possible speech option(s) in accordance with each scene, in association with that scene.

The audio output section 4 is, for example, a speaker. The speech control section 26 converts the speech content determined by the speech content determining section 25 into voice audio and outputs and controls the audio output section 4 to output the voice audio (action control processing). The speech control section 26 may synthesize the voice audio using, for example, known voice audio synthesis techniques.

A method used for transferring of data (including images) between functional blocks is not particularly limited. For example, as will be described later, data may be transferred via a storage section or via a communication interface.

(Hardware Configuration of Mobile Body Control Device 1)

Figure 2:
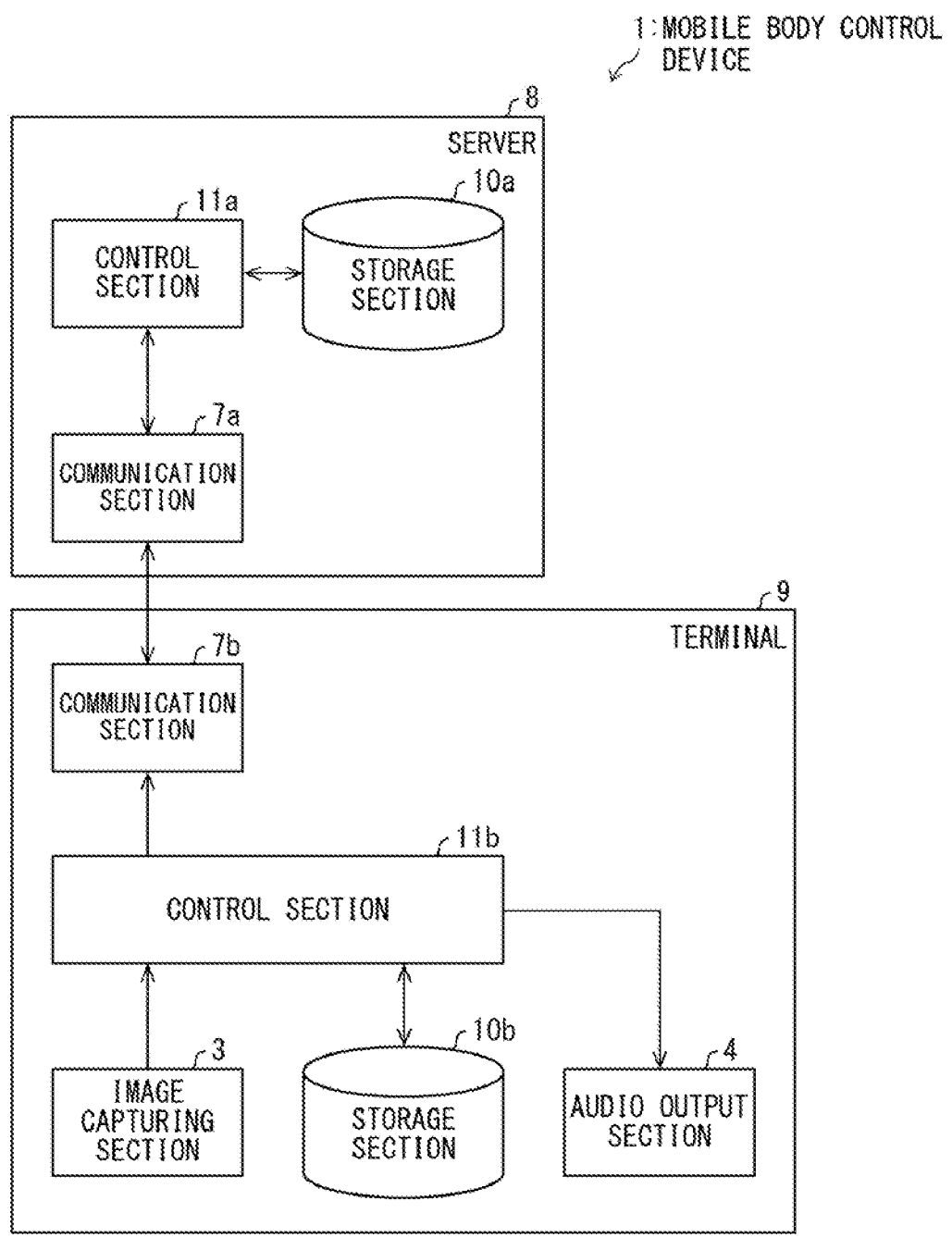
FIG. 2 is a block diagram illustrating an example of a hardware configuration of the mobile body control device in accordance with Embodiment 1 of the present invention.

FIG. 2 is a block diagram illustrating an example of a hardware configuration of the mobile body control device 1 in accordance with Embodiment 1. In one example, the mobile body control device 1 includes a server 8 and a terminal (mobile body device) 9, as shown in FIG. 2.

The server 8 includes a communication section 7a, a storage section 10a, and a control section 11a. The communication section 7a is a communication interface for communicating with the terminal 9. The storage section 10a stores a portion of the DBs or all of the DBs. The storage section 10a is also used for input/output of data between blocks. The control section 11a is an arithmetic logic unit that has a function of comprehensively controlling various components of the server 8. The control section 11a is capable of executing processes of a portion of or all of the functional blocks of the control section 2 illustrated in FIG. 1.

Possible examples of the terminal 9 include, but are not limited to, a mobile phone terminal such as a smartphone, a mobile information terminal such as a tablet, a portable small robot, or a self-propelled robot such as a robotic vacuum cleaner. The terminal 9 may be any device (mobile body device) that achieves mobility by being carried by the user or by autonomous movement.

The terminal 9 includes an image capturing section 3, an audio output section 4, a communication section 7b, a storage section 10b, and a control section 11b. The communication section 7b is a communication interface for communicating with the server 8. The storage section 10b stores a portion of the DBs or all of the DBs. The storage section 10b is also used for input/output of data between blocks. The control section 11b is an arithmetic logic unit that has a function of comprehensively controlling various components of the terminal 9. The control section 11b is capable of executing processes of a portion of or all of the functional blocks of the control section 2 illustrated in FIG. 1.

The processes handled by the various functional blocks of the control section 2 illustrated in FIG. 1 can be divided between (i) the control section 11a of the server 8 and (ii) the control section 11b of the terminal 9. For example, the control section 11a of the server 8 may carry out processes handled by the scene inferring section 24 and the speech content determining section 25, and the control section 11b of terminal 9 may carry out processes handled by the image acquiring section 21, the object detecting section 22, the image recognition section 23, and the speech control section 26, as indicated by the dotted line creating a border in the rectangle representing the control section 2 in FIG. 1. The processes handled by the various functional blocks of the control section 2 can be divided in some other manner between the control section 11a and the control section 11b.

(Operations of Mobile Body Control Device 1)

Figure 3:
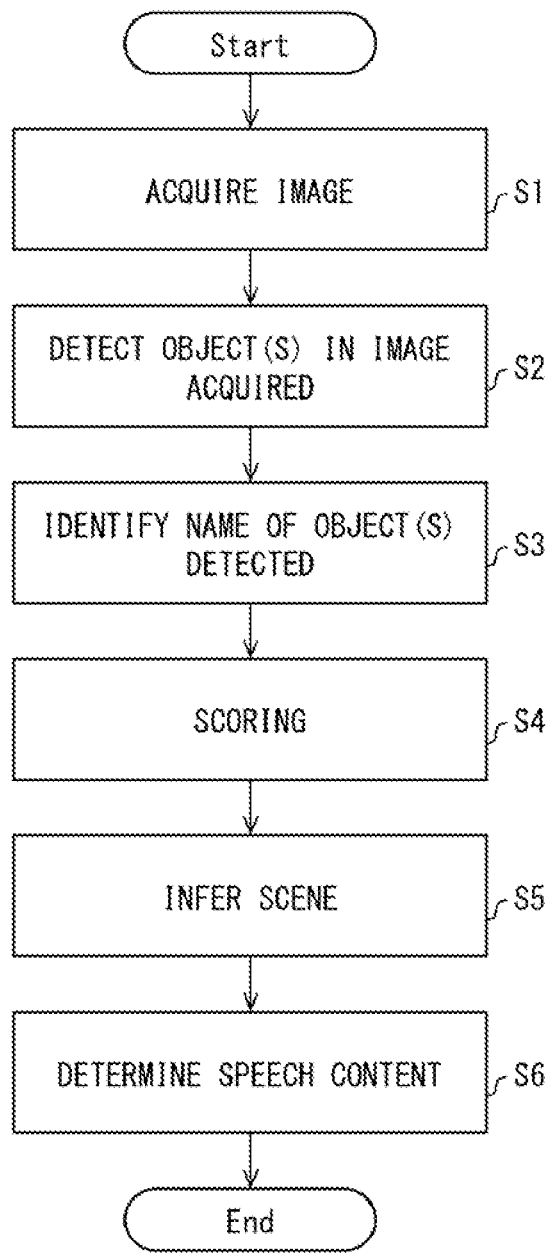
FIG. 3 is a flowchart for explaining an example of operations of the mobile body control device in accordance with Embodiment 1 of the present invention.

FIG. 3 is a flowchart for explaining an example of operations of the mobile body control device 1 in accordance with Embodiment 1.

First, the image acquiring section 21 acquires the captured image of the surrounding environment of the terminal 9 via the image capturing section 3 (step S1). The captured image is stored, for example, in the storage section 10b.

Subsequently, the object detecting section 22 carries out object detecting processing on the captured image so as to identify an area in which an object be shown. In doing so, the object detecting section 22 may identify one area or a plurality of areas. Next, the object detecting section 22 cuts out each area from the captured image, so as to generate detected image data corresponding to each area (step S2). In a case where the object detecting section 22 does not detect the object (i.e., in a case where 0 pieces of detected image data are created), the processing of step S3 and subsequent steps is not carried out.

As an algorithm for the object detection processing, a known algorithm such as Selective Search or Objectness can be used. Area identification can be carried out, for example, with use of coordinate information which represents an area. Examples of how the coordinate information can be expressed include, but are not limited to: (upper left vertex coordinate, horizontal width, vertical width); and (upper left vertex coordinate, lower right vertex coordinate).

Figure 4:
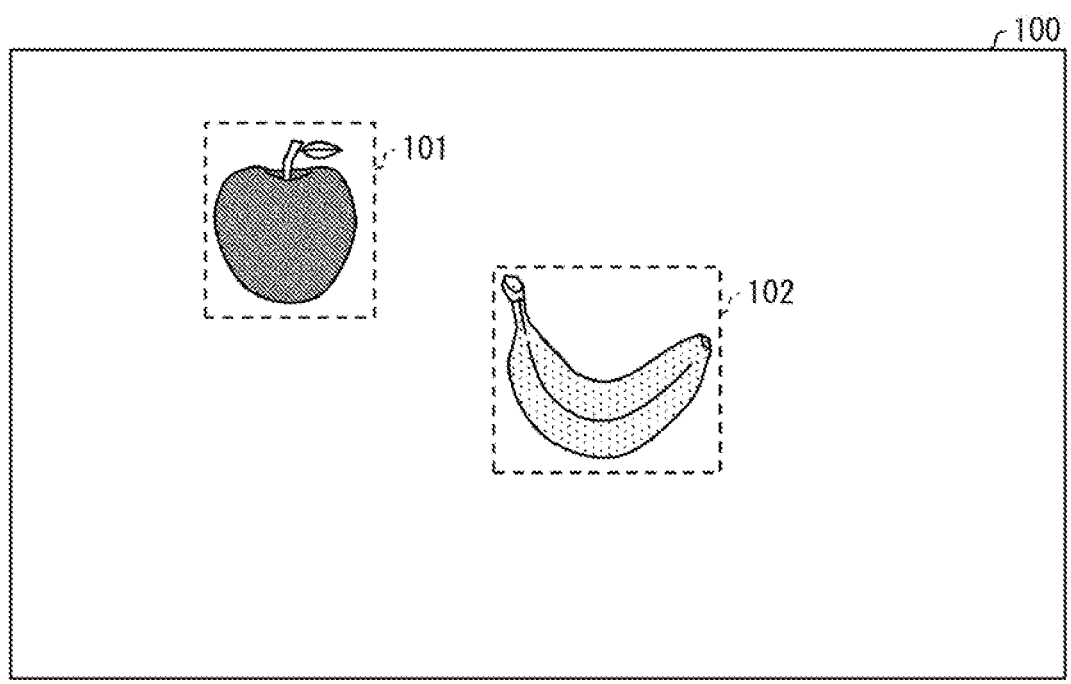
FIG. 4 is a diagram for explaining an example of object detection carried out by the mobile body control device in accordance with Embodiment 1 of the present invention.

FIG. 4 is a diagram for explaining an example of object detection carried out by the mobile body control device 1 in accordance with Embodiment 1. Shown in a captured image 100 are an apple and a banana. The object detecting section 22 identifies, from the captured image 100, an area 101 in which the apple is shown and an area 102 in which the banana is shown. Thereafter, the object detecting section 22 cuts out each area so as to generate detected image data 1 and detected image data 2.

Subsequently, the image recognition section 23 refers to the object DB 5a and carries out image recognition processing on each piece of the detected image data generated by the object detecting section 22, so as to identify the name of an object shown in each piece of the detected image data generated. As an algorithm for the image recognition processing, a deep learning technique using a convolutional neural network can be suitably used. This is because such a deep learning technique has recently achieved high accuracy. Other possible examples of an algorithm for image recognition processing include pattern matching and the like.

Figure 10:
FIG. 10 is a table showing one example of a result of the processing carried out by the image recognition section 23.

FIG. 10 is a table showing one example of a result of the processing carried out by the image recognition section 23. As shown in FIG. 10, a name 1, a name 2, . . . and a name n are identified for the detected image data 1, the detected image data 2, . . . and detected image data n, respectively. For example, "apple" is identified for the detected image data from area 101 shown in FIG. 4, and "banana" is identified for the detected image data from area 102 shown in FIG. 4. It should be noted that data indicating the name need not be a text string; the data may be, for example, an index (a numerical value, etc.), an ID, or the like which is associated with the name.

Next, the scene inferring section 24 obtains a combination (set) of names etc. of the objects identified by the image recognition section 23, refers to the association information indicating the association between each object and each scene stored in the scene DB 5b, and performs scoring (step S4).

In the processing for scoring, the scene inferring section 24 adds a point value to each scene associated with each object identified by the image recognition section 23. The following description will discuss the processing for scoring in detail, by way of example.

Table 2 shows an example of association information stored in the scene DB 5b. Each row in Table 2 indicates a scene (type of room). Each column in Table 2 indicates a name of an object. A numerical value is assigned to each cell in advance. A higher numerical value corresponds to a higher probability that the object of the column for that cell will exist in the scene of the column for that cell.

TABLE 2

|  | Television | Sofa | Bed | Pillow | Sponge | Frying pan | Toothbrush | Soap | . . . |
|---|---|---|---|---|---|---|---|---|---|
| Living room | 10 | 9 | 1 | 3 | 0 | 0 | 0 | 0 | |
| Kitchen | 1 | 0 | 0 | 0 | 10 | 10 | 0 | 3 | |
| Bedroom | 5 | 2 | 10 | 10 | 0 | 0 | 0 | 0 | |
| Washroom | 0 | 0 | 0 | 0 | 3 | 0 | 10 | 10 | |
| . . . | | | | | | | | | |

For each row (scene) in Table 2, the scene inferring section 24 combines the numerical values of columns corresponding to an object identified by image recognition section 23. The scene inferring section 24 uses the combined numerical values as the score of each scene. The scene inferring section 24 then infers that the scene having the highest score is the scene in which the terminal 9 is located (step S5).

As one example, in a case where the objects identified by the image recognition section 23 are a "television" and a "sofa", the score of the scene "living room" is 19 because, in the row for the scene "living room", (i) the numerical value of the column corresponding to "television" is 10, and (ii) the numerical value of the column corresponding to "sofa" is 9, as shown in Table 3. Similarly, the score of the scene "kitchen" is 1, the score of the scene "bedroom" is 7, and the score of the scene "washroom" is 0. As a result, the scene inferring section 24 infers that the scene "living room", which has the highest score, is the scene in which the terminal 9 is located.

TABLE 3

|  | Television | Sofa | . . . | Total |
|---|---|---|---|---|
| Living room | 10 | 9 | | 19 |
| Kitchen | 1 | 0 | | 1 |
| Bedroom | 5 | 2 | | 7 |
| Washroom | 0 | 0 | | 0 |
| . . . | | | | |

As another example, in a case where the objects identified by the image recognition section 23 are a "sponge", a "frying pan" and "soap", the score of the scene "kitchen" is 23, because in the row for the scene "kitchen", (i) the numerical value of the column corresponding to "sponge" is 10, (ii) the numerical value of the column corresponding to "frying pan" is 10, and (iii) the numerical value of the column corresponding to "soap" is 3, as shown in Table 4. Similarly, the score of the scene "living room" is 0, the score of the scene "bedroom" is 0, and the score of the scene "washroom" is 13. As a result, the scene inferring section 24 infers that the scene "kitchen", which has the highest score, is the scene in which the terminal 9 is located.

TABLE 4

| | Sponge | Frying pan | Soap | ... | Total |
|---|---|---|---|---|---|
| Living room | 0 | 0 | 0 | | 0 |
| Kitchen | 10 | 10 | 3 | | 23 |
| Bedroom | 0 | 0 | 0 | | 0 |
| Washroom | 3 | 0 | 10 | | 13 |
| ... | | | | | |

Next, the speech content determining section 25 refers to the action DB 5c and determines speech content in accordance with the scene inferred by the scene inferring section 24 (step S6). For example, in a case where (i) the scene inferring section 24 has inferred that the scene "kitchen" is the scene in which the terminal 9 is located and (ii) the action DB 5c has stored, in association with the scene "kitchen", possible speech options as shown in Table 5, the speech content determining section 25 determines the speech content to be spoken by the terminal 9 by selecting a possible speech option from among options such as "Would you like to set a timer?" and "What sort of recipe do you want?"

TABLE 5

| Scene | Possible speech options |
|---|---|
| Kitchen | Would you like to set a timer? |
| | Would you like me to find a recipe? |
| | ... |
| | ... |
| | ... |

The speech control section 26 then synthesizes voice audio of the speech content determined by the speech content determining section 25 and controls the audio output section 4 to output the voice audio, in a manner so that it appears the terminal 9 is speaking spontaneously.

In this way, the mobile body control device 1 can (i) infer the scene (type of room) in which the terminal 9 is located on the basis of the captured image and (ii) control the terminal 9 to output speech in accordance with the scene inferred. The mobile body control device 1 therefore makes it possible to control the terminal 9 to speak more naturally.

(Variation 1)

It should be noted that the control section 2 of the mobile body control device 1 may infer the scene using a method differing from the scene inference processing carried out by the object detecting section 22, the image recognition section 23, and the scene inferring section 24.

For example, in one variation, the control section 2 may infer the scene in which the terminal 9 is located by carrying out direct image recognition of the captured image itself, with use of a deep learning technique. However, such a deep learning technique requires obtaining a large number of captured images corresponding to each scene and carrying out machine learning with use of the captured images. Unfortunately, in the case of a scene which is a room, for example, privacy issues arise and make it difficult to obtain a large number of images for machine learning. However, with a process that involves image recognition of each object with use of a deep learning technique as described in the Embodiment 1, the images for machine learning are the captured image of each object. This avoids privacy issues and makes it easy to gather images for machine learning.

(Variation 2)

The mobile body control device 1 may be configured to control the terminal 9 to carry out an action other than speech.

For example, one variation can be configured as follows. The mobile body control device 1 includes (i) an action determining section instead of the speech content determining section 25 and (ii) an action control section instead of the speech control section 26. The action DB 5c stores possible action options in association with each scene. The action determining section determines, as the action to be carried out by the terminal 9, an action in accordance with a scene inferred by the scene inferring section 24. For example, in a case where (i) the scene inferring section 24 infers that the scene "living room" is the scene in which the terminal 9 is located and (ii) the action DB 5c stores possible action options as shown in Table 6 in association with the scene "living room", the action determining section determines the action to be carried out by the terminal 9 by selecting one possible action option from among options such as dancing and singing.

TABLE 6

| Scene | Possible action options |
|---|---|
| Living room | Dance |
| | Sing |
| | ... |
| | ... |
| | ... |

Then, the action control section controls the terminal 9 to carry out the action determined by the action determining section. With this configuration, the mobile body control device 1 can (i) infer the scene (type of room) in which the terminal 9 is located on the basis of the captured image and (ii) control the terminal 9 to carry out an action (in particular, a voluntary action) in accordance with the scene. The mobile body control device 1 therefore makes it possible to control the terminal 9 to carry out a more natural action.

(Variation 3)

The mobile body control device 1 may be configured so that the server 8 is omitted and all components are included in the terminal 9 only. In other words, the mobile body control device 1 illustrated in FIG. 1 may be the terminal 9.

Embodiment 2

Figure 5:
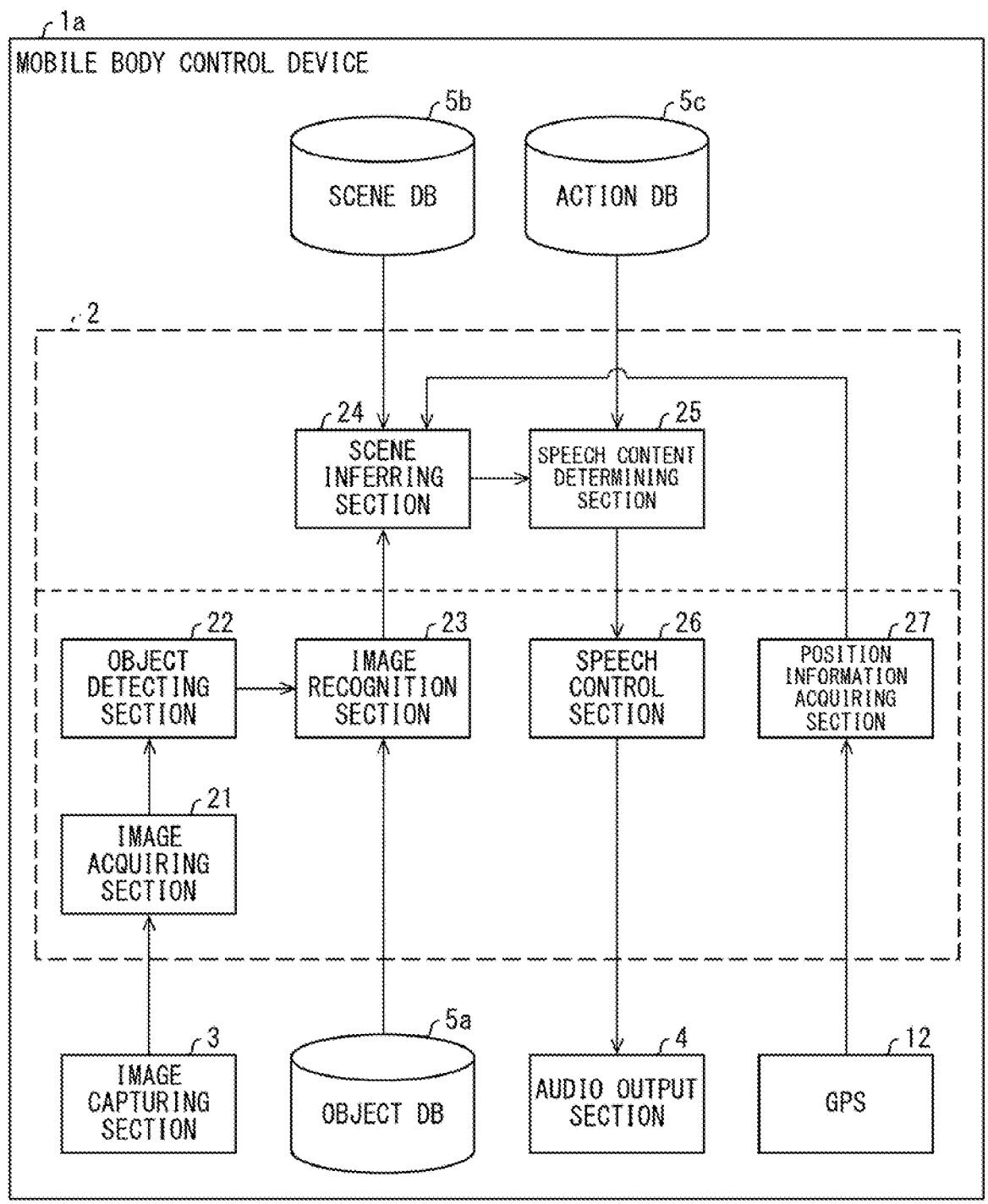
FIG. 5 is a block diagram illustrating a configuration of main parts of a mobile body control device in accordance with Embodiment 2 of the present invention.

The following description will discuss Embodiment 2 of the present invention with reference to FIG. 5. For convenience, members similar in function to those described in the foregoing embodiment will be given the same reference signs, and their description will be omitted.

FIG. 5 is a block diagram illustrating a configuration of main parts of a mobile body control device 1a in accordance with Embodiment 2. As shown in FIG. 5, the mobile body control device 1a differs from the mobile body control device 1 of Embodiment 1 in that: (i) mobile body control device 1a includes a GPS (Global Positioning System) 12; (ii) in the mobile body control device 1a, a control section 2 includes a position information acquiring section 27; and (iii) in the mobile body control device 1a, the position information acquiring section 27 acquires position information from the GPS 12, and a scene inferring section 24 infers a scene with further reference to the position information acquired by the position information acquiring section 27.

For example, in one aspect, the scene inferring section 24 determines, in accordance with the position information, whether or not the terminal 9 is in the user's house. The method of determination is not particularly limited. A known method can be used. For example, the position information acquiring section 27 may acquire the position information of the terminal 9 at a plurality of times, and identify the position of the user's house as being a position where the terminal 9 is frequently present at night. The scene inferring section 24 can then determine whether the terminal 9 is in the user's house by determining whether or not the current position information is within a predetermined range from the position of the user's house. The scene inferring section 24 may be configured carry out scene inference only in a case where the terminal 9 is in the user's house.

Another aspect may employ a configuration in which (i) the scene DB 5b stores association information for each location and (ii) the scene inferring section 24 refers to the association information corresponding to the location identified according to the position information and then carries out scene inference in accordance with the association information. Possible examples of locations other than the above-mentioned user's house include, for example, a commercial facility. For example, in a case where (i) the scene DB 5b stores association information for a commercial facility as shown in Table 7 and (ii) the position information indicates a position within the commercial facility, the scene inferring section 24 may refer to the association information for the commercial facility and infer a scene (store department). The speech content determining section 25 then determines speech content in accordance with the store department. For example, if the scene inferred by the scene inferring section 24 is an electronic appliances department, the speech content determining section 25 determines, as the speech content, a topic related to electronic appliances, detailed information of about an electronic appliance, or the like.

This configuration enables the mobile body control device 1a to more suitably infer the scene in which the terminal 9 is located.

Embodiment 3

Figure 6:
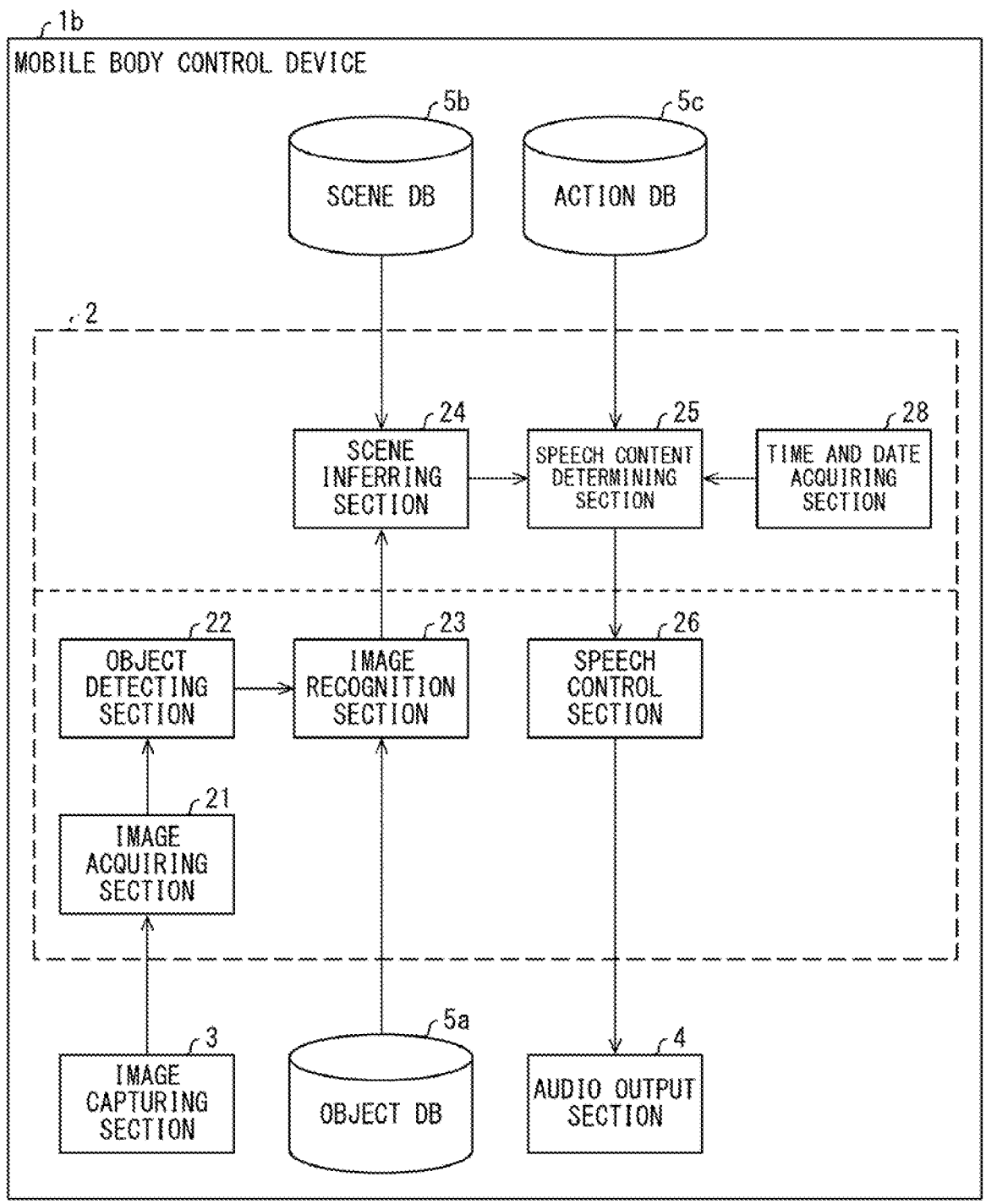
FIG. 6 is a block diagram illustrating a configuration of main parts of a mobile body control device in accordance with Embodiment 3 of the present invention.
Figure 7:
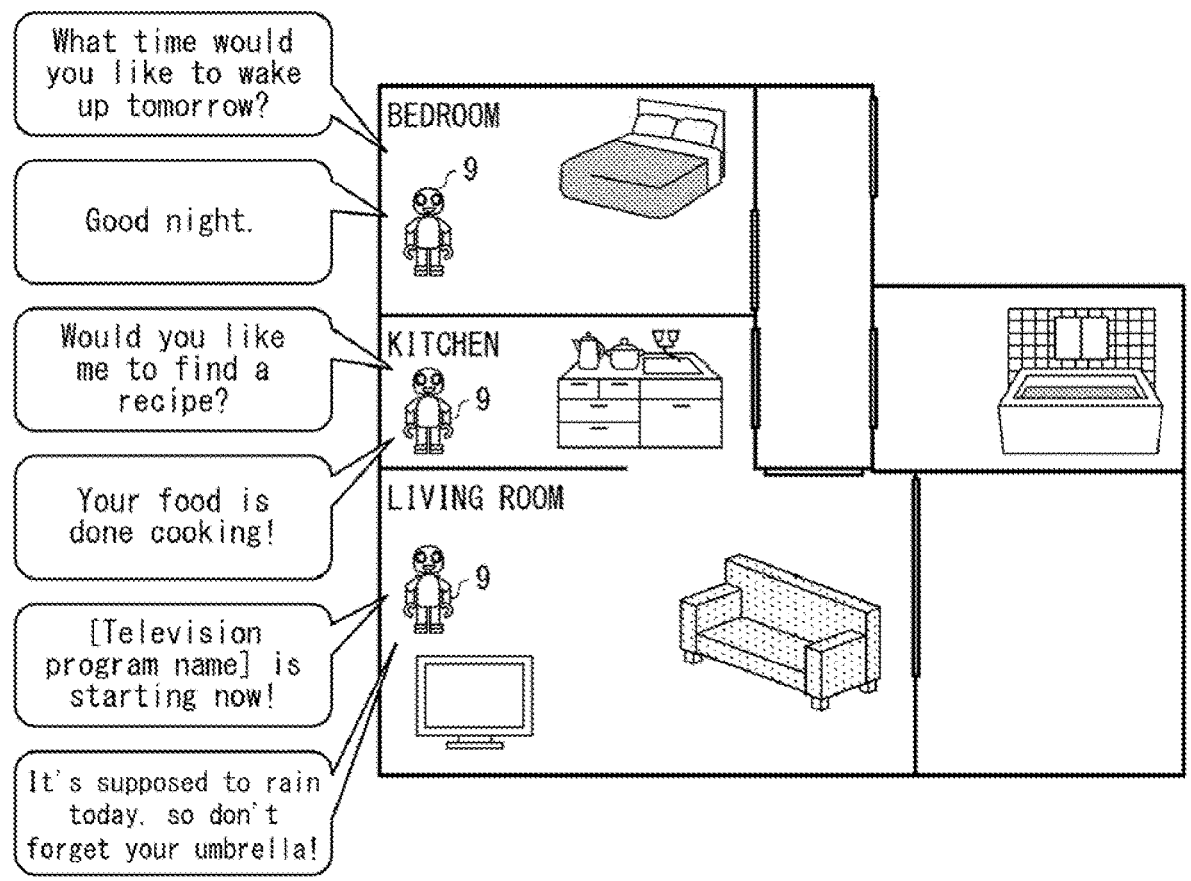
FIG. 7 is a diagram for explaining examples of speech outputted by a terminal controlled by the mobile body control device in accordance with Embodiment 3 of the present invention.

The following description will discuss Embodiment 3 of the present invention with reference to FIGS. 6 and 7. For convenience, members similar in function to those described in the foregoing embodiments will be given the same reference signs, and their description will be omitted.

FIG. 6 is a block diagram illustrating a configuration of main parts of a mobile body control device 1b in accordance with Embodiment 3. As shown in FIG. 6, the mobile body control device 1b differs from the mobile body control device 1 of Embodiment 1 in that: (i) in the mobile body control device 1b, a control section 2 includes a time and date acquiring section 28; and (ii) in the mobile body control device 1b, a speech content determining section 25 determines speech content with further reference to the time and date information obtained by the time and date acquiring section 28. The time and date information is information indicating a point in time. The time and date information indicates at least one of the time of day (hour, minute, second, millisecond, etc.) and the calendar date (year, month, week, season, day, etc.).

The action DB 5c stores information which, in association with each scene, indicates possible speech options and a time/date condition. The speech content determining section 25 determines, as the speech content to be spoken by the terminal 9, speech content in accordance with (i) the scene inferred by the scene inferring section 24 and (ii) the time and date information acquired by the time and date acquiring section 28.

For example, in a case where (i) the scene inferring section 24 has inferred that the scene "living room" is the scene in which the terminal 9 is located and (ii) the action DB 5c stores the possible action options shown in Table 8 in association with the scene "living room", the speech content determining section 25 determines speech such as the following: when the time and date (time of day) satisfy a predetermined condition, the speech "[Television program name] is about to start!"; when the number of occurrences a certain day of the week satisfies a predetermined condition in that month, the speech "Wednesday this week is the day to put out non-burnable trash!"; or when the time and date (calendar date) satisfy a predetermined condition, the speech "[Food name] will be in season soon!".

TABLE 7

|  | Television | Sofa | Bed | Pillow | Sponge | Frying pan | Toothbrush | Soap | ... |
|---|---|---|---|---|---|---|---|---|---|
| Electronic appliances department | 10 | 1 | 0 | 0 | 0 | 0 | 0 | 0 | |
| Furniture department | 5 | 10 | 10 | 5 | 0 | 0 | 0 | 0 | |
| Kitchen appliances department | 0 | 0 | 0 | 0 | 5 | 10 | 0 | 1 | |
| Pharmacy | 1 | 0 | 0 | 0 | 5 | 0 | 10 | 10 | |
| ... | | | | | | | | | |

TABLE 8

| Scene | Possible speech options | Reference |
|---|---|---|
| Living room | [Television program name] is about to start! | Time and date (time of day) |
| | Wednesday this week is the day to put out non-burnable trash! | Time and date (number of occurrences of day of week) |
| | [Food name] will be in season soon! | Time and date (calendar date) |
| ... | ... | |

The speech control section 26 then controls the terminal 9 to carry out the speech content determined by the speech content determining section 25. With this configuration, the mobile body control device 1b can infer the scene (type of room) in which the terminal 9 is located based on the captured image and control the terminal 9 to output speech which is suited not only to the scene inferred, but also to the time and date or information regarding a time/date interval (for example, counter information such as the number of occurrences of a certain day of the week in a certain month). This configuration therefore makes it possible to control the terminal 9 to speak more naturally.

FIG. 7 is a diagram illustrating examples of speech by the terminal 9 in accordance with Embodiment 3. As illustrated in FIG. 7, in a case where the terminal 9 is in the bedroom and the time is night, the terminal 9 outputs speech such as "What time would you like to wake up tomorrow?" or "Good night!". In a case where the terminal 9 is in the kitchen, the terminal 9 outputs speech such as, "Would you like me to find a recipe?" or, if the current time matches a preset time at which a dish will finish cooking, "Your food is done cooking!". In a case where the terminal 9 is in the living room and the current time matches the starting time of a predetermined television program, the terminal 9 outputs speech such as "[Television program name] is starting now!". In a case where the terminal 9 is in the living room, the time is in the morning, and the weather forecast predicts rain, the terminal 9 outputs speech such as "It's supposed to rain today, so don't forget your umbrella!". In this manner, the speech content determining section 25 may determine the speech content based on a comparison of the time information with, for example, (i) predetermined time periods such as day and night, (ii) various times which are set as necessary, such as the ending time of a preset timer, or (iii) a predetermined time at which a television program or the like will start. The speech content determining section 25 may determine the speech content with use of information that can be obtained based on the time and date, such as information on television programs or the weather forecast. The speech content determining section 25 may determine the speech content based on a comparison of the calendar date information with, for example, (i) predetermined time periods such as spring, summer, autumn, and winter, (ii) various dates which are set as necessary, such as preset date of a planned engagement, or (iii) predetermined dates such as the date of an event.

This makes it possible for the mobile body control device 1b to control the terminal 9 to output more natural speech content.

Embodiment 4

Figure 8:
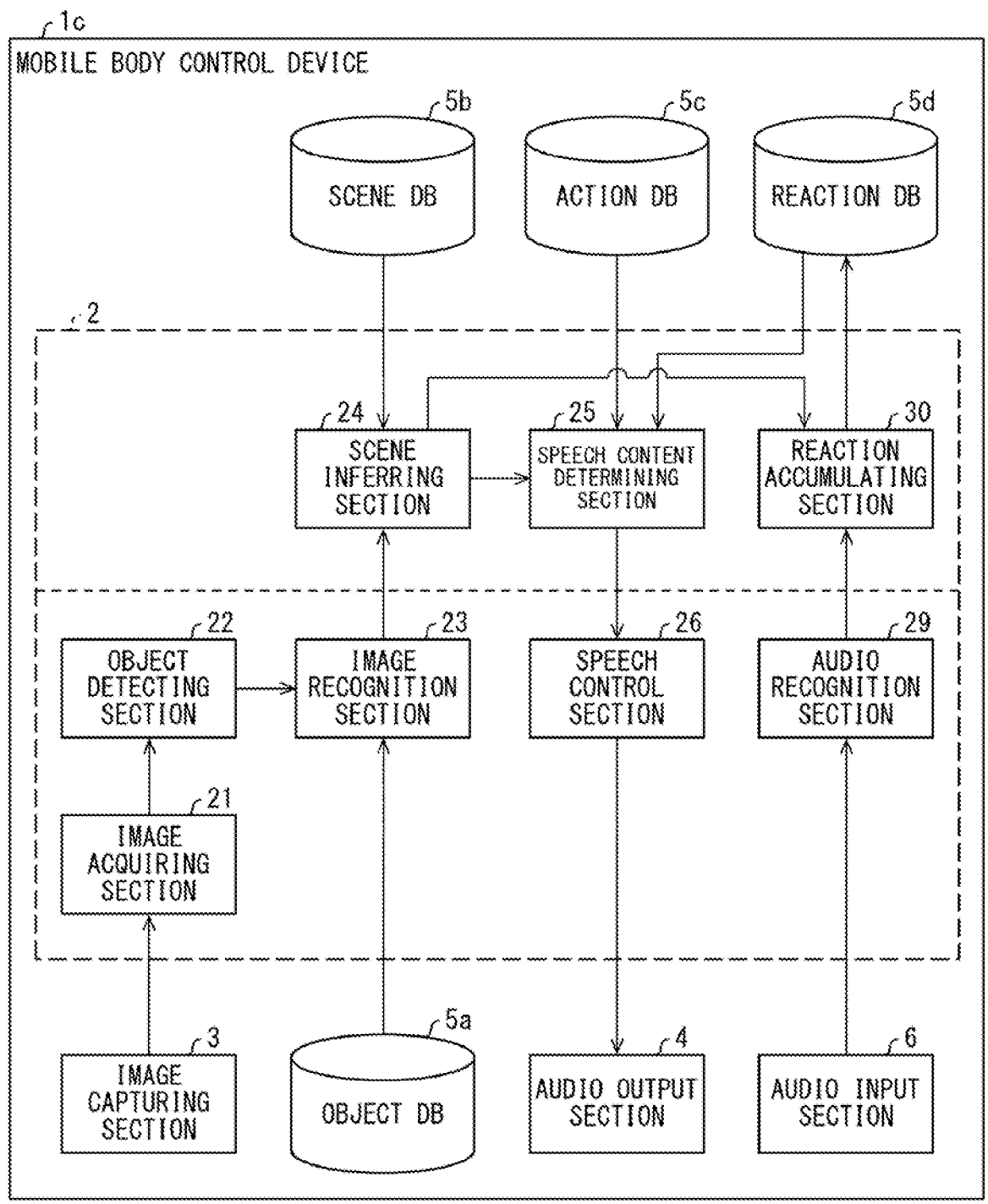
FIG. 8 is a block diagram illustrating a configuration of main parts of a mobile body control device in accordance with Embodiment 4 of the present invention.

The following description will discuss Embodiment 4 of the present invention with reference to FIG. 8. For convenience, members similar in function to those described in the foregoing embodiments will be given the same reference signs, and their description will be omitted.

FIG. 8 is a block diagram illustrating a configuration of main parts of a mobile body control device 1c in accordance with Embodiment 4. As shown in FIG. 8, the mobile control device 1c differs from the mobile control device 1 of the Embodiment 1 in that: (i) the mobile control device 1c includes an audio input section 6 and a reaction database (reaction storage section) 5d; (ii) in the mobile control device 1c, a control section 2 includes an audio recognition section (reaction detecting section) 29 and a reaction accumulating section 30; (iii) in the mobile control device 1c, the user's reaction to the speech of the terminal 9 outputted by the audio output section 4 is inputted via the audio input section 6; (iv) in the mobile control device 1c, the audio recognition section 29 identifies the user's reaction inputted into the audio input section 6; (v) in the mobile body control device 1c, the scene inferring section 24 demarcates individual scenes on the basis of combinations of objects identified by the image recognition section 23; (vi) in the mobile body control device 1c, the reaction accumulating section 30 accumulates, in the reaction DB 5d, the type of user reaction identified by the audio recognition section 29 in a manner so that the type of the reaction is associated with (a) a scene demarcated by the scene inferring section 24 and (b) the speech of the terminal 9 outputted by the audio output section 4; and (vii) in the mobile control device 1c, the speech content determining section 25 determines the speech content with reference to (a) the scenes demarcated by the scene inferring section 24 and (b) the reaction DB 5d.

The audio input section 6 includes, for example, a microphone, and acquires voice audio data from the user as input information. The audio recognition section 29 detects the start and end of human voice audio in the voice audio data acquired by the audio input section 6. The audio recognition section 29 extracts a portion of the voice audio data corresponding to the human voice audio and carries out voice recognition on the extracted portion. In this way, the audio recognition section 29 identifies the content of a user reaction from the voice audio data from the user.

When the scene inference processing has been carried out, the scene inferring section 24 demarcates individual scenes on the basis of each combination of objects identified by the image recognition section 23 and then registers each demarcated scene in the reaction DB 5d. For example, as shown in Table 9, each time a scene has been inferred from a new combination of objects, the combination is registered as a room 1, a room 2, etc. in the reaction DB 5d. Scenes having the same combination of objects or similar combinations of objects may be registered as the same room.

TABLE 9

| | Television | Sofa | Bed | Pillow | Sponge | Frying pan | Toothbrush | Soap | ... | Scene |
|---|---|---|---|---|---|---|---|---|---|---|
| Room 1 | Yes | Yes | | Yes | | | | | | Living room |
| Room 2 | | | Yes | Yes | | | | | | Bedroom |

TABLE 9-continued

| | Television | Sofa | Bed | Pillow | Sponge | Frying pan | Toothbrush | Soap | ... | Scene |
|---|---|---|---|---|---|---|---|---|---|---|
| Room 3 | | | | | Yes | Yes | | Yes | | Kitchen |
| Room 4 | | | | | | | Yes | Yes | | Washroom |
| ... | | | | | | | | | | |

The reaction accumulating section 30 then identifies the type of the user's reaction content (positive, negative, etc.) in accordance with the reaction content of the user identified by the audio recognition section 29. Thereafter, as shown in Table 10, the reaction accumulating section 30 causes the reaction DB 5d to store the identified type of the reaction content in association with (i) a scene demarcated by the scene inferring section 24 and (ii) the speech content to which the user reacted.

TABLE 10

| Location | Possible speech options | Reaction |
|---|---|---|
| Room 1 | [Television program name] is about to start! | Negative |
| | Wednesday this week is the day to put out non-burnable trash! | Positive |
| | ... | |
| | ... | |
| | ... | |

The speech content determining section 25 refers to the reaction DB 5d and then determines the speech content in a manner so as to avoid selecting speech content for which negative reaction content is stored in association with the scene demarcated by the scene inferring section 24.

For example, in a case where the terminal 9 has outputted particular speech content in room 1 and the user reacted negatively thereto, the reaction accumulating section 30 causes the reaction DB 5d to store a flag in association with (i) room 1 and (ii) the speech content in question, the flag indicating a negative reaction. The negative reaction may be, for example, an absence of speech from the user, or a reaction in which the user used negative wording such as "That's not" or "I don't". In a case where the user has reacted negatively, the reaction accumulating section 30 may increment a counter associated with (i) the scene and (ii) the speech content to which the user reacted, and cause the reaction DB 5d to store a flag when the counter exceeds a threshold. Thereafter, when determining speech content in a room where an identified combination of objects is identical or similar to that of room 1, the speech content determining section 25 refers to the reaction DB 5d and determines the speech content in a manner so as to avoid the particular speech content which has a flag indicating a negative reaction.

This makes it possible for the speech content of the terminal 9 to reflect in detail the user's reactions in each scene. It is therefore possible to control the terminal 9 to speak more naturally.

Embodiment 5

Discussed in the preceding embodiments were examples which each utilized one server 8. However, it is possible to use separate servers to realize each function of the server 8. In a case where a plurality of servers is employed, each server may be managed by the same operator or by differing operators.

Embodiment 6

Each block of the mobile body control devices 1, 1a, 1b, and 1c, the server 8, and the terminal 9 can be realized by a logic circuit (hardware) provided in an integrated circuit (IC chip) or the like or can be alternatively realized by software as executed by a central processing unit (CPU). In the latter case, the control section 2 of the mobile body control devices 1, 1a, 1b, and 1c, the control section 11a of the server 8, and the control section 11b of the terminal 9 can each be realized by a computer (electronic computer) as illustrated in FIG. 9.

Figure 9:
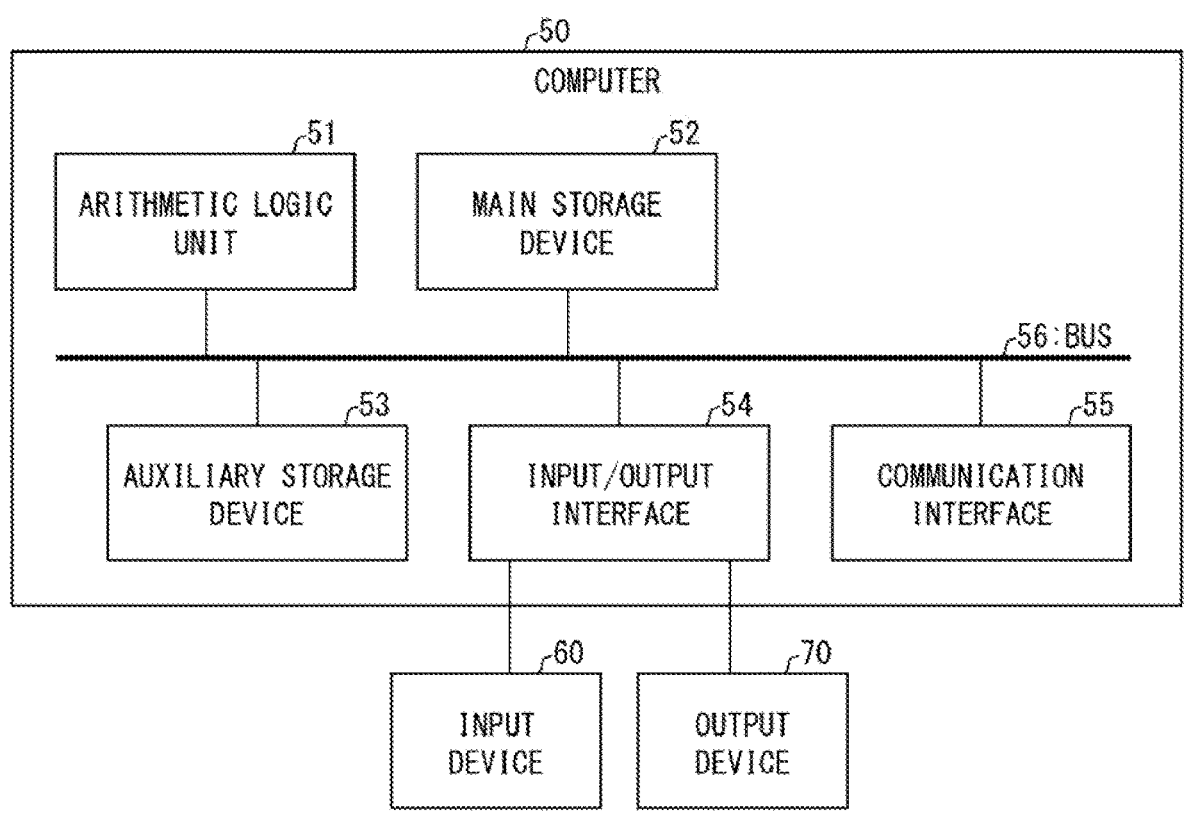
FIG. 9 is a block diagram illustrating a configuration of a computer which can be used as a control section.

FIG. 9 is a block diagram illustrating a configuration of a computer 50 by which the control section 2 of the mobile body control devices 1, 1a, 1b, and 1c, the control section 11a of the server 8, and the control section 11b of the terminal 9 can each be realized. The computer 50 includes (i) an arithmetic logic unit 51, (ii) a main storage device 52, (iii) an auxiliary storage device 53, (iv) an input/output interface 54, and (v) a communication interface 55 that are connected to each other via a bus 56. The arithmetic logic unit 51, the main storage device 52, and the auxiliary storage device 53 may be realized by, for example, a CPU, a random access memory (RAM), and storage such as a hard disk drive or flash memory, respectively. The input/output interface 54 is connected with (i) an input device 60 via which a user inputs various information into the computer 50 and (ii) an output device 70 via which the computer 50 outputs various information to the user. Each of the input device 60 and the output device 70 can be provided integrally in the computer 50 or can alternatively be connected to the computer 50 (externally connected to the computer 50). For example, the input device 60 can be a keyboard, a mouse, a touch sensor, or the like, and the output device 70 can be a display, a printer, a speaker, or the like. Alternatively, a device having both of a function of the input device 60 and a function of the output device 70 (such as a touch panel into which a touch sensor and a display are integrated) can be employed. The communication interface 55 is an interface via which the computer 50 communicates with an external device.

The auxiliary storage device 53 stores various programs for causing the computer 50 to operate as the control section 2 of the mobile body control devices 1, 1a, 1b, and 1c, the control section 11a of the server 8, or the control section 11b of the terminal 9. The arithmetic logic unit 51 causes the computer 50 to operate as sections included in the control section 2 of the mobile body control devices 1, 1a, 1b, and 1c, the control section 11a of the server 8, or the control section 11b of the terminal 9 by (i) loading, onto the main storage device 52, the programs stored in the auxiliary storage device 53 and (ii) executing instructions carried out in the programs. Note that a recording medium which is included in the auxiliary storage device 53 for recording information, such as the various programs, only needs to be a computer-readable "non-transitory tangible medium." Examples of the recording medium include tapes, disks, cards, semiconductor memories, and programmable logic circuits.

The various programs can be obtained from outside of the computer 50. In such a case, the various programs can be obtained via any transmission medium (such as a communication network or a broadcast wave). An aspect of the present invention can also be achieved in the form of a computer data signal in which the various programs are embodied via electronic transmission and which is embedded in a carrier wave.

[Recap]

A mobile body control device (1, 1a, 1b, 1c) in accordance with Aspect 1 of the present invention includes: an image acquiring section (21); an action control section (26) and one or more processors (control section 2), the image acquiring section being configured to acquire an image of a surrounding environment of a specific mobile body device (terminal 9), the one or more processors being configured to carry out: scene inference processing in which the one or more processors refer to the image acquired by the image acquiring section and infer, in accordance with the image, a scene in which the specific mobile body device is located; action determination processing in which the one or more processors determine an action, in accordance with the scene inferred, to be carried out by the specific mobile body device; and action control processing in which the one or more processors control the specific mobile body device to carry out the action determined.

The above configuration makes it possible to infer a scene in which a specific mobile body device is located and control the specific mobile body device to carry out an action suited to that scene.

In Aspect 2 of the present invention, the mobile body control device of Aspect 1 may be configured such that in the scene inference processing, the one or more processors identify objects in the image and infer a scene in accordance with a combination of the objects identified.

The above configuration makes it possible to suitably infer a scene in which a specific mobile body device is located.

In Aspect 3 of the present invention, the mobile body control device of Aspect 2 may be configured so as to further include: an association information storage section (scene DB 5b) configured to store association information which indicates an association between an object and a scene, wherein in the scene inference processing, the one or more processors refer to the association information and infer a scene in accordance with (i) a combination of the objects identified and (ii) the association information.

The above configuration makes it possible to suitably infer a scene in which a specific mobile body device is located.

In Aspect 4 of the present invention, the mobile body control device (1a) of any one of Aspects 1 to 3 may be configured so as to further include: a position information acquiring section (27) configured to acquire position information of the specific mobile body device, wherein in the scene inference processing, in addition to referring to the image, the one or more processors further refer to the position information acquired by the position information acquiring section and infer a scene in accordance with the image and the position information.

The above configuration makes it possible to suitably infer a scene in which a specific mobile body device is located.

In Aspect 5 of the present invention, the mobile body control device of any one of Aspects 1 to 4 may be configured such that in the scene inference processing, the one or more processors infer, as the scene, a room in which the specific mobile body device is located.

The above configuration makes it possible to suitably infer a scene in which a specific mobile body device is located in a case where the specific mobile body device is in a house.

In Aspect 6 of the present invention, the mobile body control device of any one of Aspects 1 to 5 may be configured so as to further include: a second association information storage section (action DB 5c) configured to store second association information which indicates an association between a scene and an action to be carried out by the specific mobile body device, wherein in the action determination processing, the one or more processors refer to the second association information and determine, in accordance with (i) the scene inferred and (ii) the second association information, the action to be carried out by the specific mobile body device.

The above configuration makes it possible to suitably determine an action in accordance with a scene in which a specific mobile body device is located.

In Aspect 7 of the present invention, the mobile body control device of any one of Aspects 1 to 6 may be configured such that: in the action determination processing, the one or more processors determine speech content in accordance with the scene inferred; and in the action control processing, the one or more processors control the specific mobile body device to output, as speech, the speech content determined.

The above configuration makes it possible to control a specific mobile body device to speak more naturally.

A mobile body control device (1b) in accordance with Aspect 8 of the present invention may be configured as the mobile body control device of any one of Aspects 1 to 7 wherein in the action determination processing, the one or more processors refer to time and date information and determine the action in accordance with (i) the time and date information and (ii) the scene inferred.

The above configuration makes it possible to control a specific mobile body device to speak more naturally.

A mobile body control device (1c) in accordance with Aspect 9 of the present invention may be configured as the mobile body control device of Aspect 1, further comprising: a reaction detecting section (audio recognition section 29) configured to detect a reaction, of a user, to the action carried out by the specific mobile body device; and a reaction storage section (reaction DB 5d), wherein: in the scene inference processing, the one or more processors identify objects in the image and infer a scene in accordance with a combination of the objects identified; the one or more processors are configured to: demarcate individual scenes on the basis of combinations of objects identified; and control the reaction storage section to store types of reactions, detected by the reaction detecting section, in association with (i) the action corresponding to each reaction and (ii) a respective scene demarcated as above; and in the action determination processing, the one or more processors refer to the types of reactions, which types are stored in the reaction storage section in association with a respective scene demarcated as above, and determine the action in accordance with (i) the types of reactions and (ii) the scene inferred.

The above configuration makes it possible for the speech content of a specific mobile body device to reflect in detail a user's reactions in various scenes. It is therefore possible to control the specific mobile body device to speak more naturally.

The action device in accordance with each aspect of the present invention may be realized by a computer. The scope of the present invention therefore encompasses an action program for the action device which program realizes the action device by the computer by causing the computer to operate as each section (software element) of the action device, and a computer-readable storage medium in which the action program is stored.

In Aspect 11, a method of controlling a mobile body includes the steps of: (a) acquiring an image of a surrounding environment of a specific mobile body device (terminal 9) (step S1); (b) scene inference processing which involves referring to the image acquired and inferring, in accordance with the image, a scene in which the specific mobile body device (terminal 9) is located (step S2 to step S5); (c) action determination processing which involves determining an action, in accordance with the scene inferred, to be carried out by the specific mobile body device (terminal 9) (step S6); and (d) action control processing which involves controlling the specific mobile body device (terminal 9) to carry out the action determined.

The above method brings about effects similar to those of Aspect 1.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Mobile body control device
2 Control section (processor)
3 Image capturing section
4 Audio output section
5a Object DB
5b Scene DB (association information storage section)
5c Action DB (second association information storage section)
5d Reaction DB (reaction storage section)
6 Audio input section
7a, 7b Communication section
8 Server
9 Terminal (mobile body device)
10a, 10b Storage section
11a, 11b Control section
12 GPS
21 Image acquiring section
22 Object detecting section
23 Image recognition section
24 Scene inferring section
25 Speech content determining section (action determination section)
26 Speech control section (action control section)
27 Position information acquiring section
28 Time and date acquiring section
29 Audio recognition section (reaction detecting section)
30 Reaction accumulating section
100 Captured image
101, 102 Area

The invention claimed is:

1. A mobile body control device comprising:
an image acquiring section; and
one or more processors,
the image acquiring section being configured to acquire an image of a surrounding environment of a specific mobile body device,
the one or more processors being configured to carry out:
scene inference processing in which the one or more processers refer to the image acquired by the image acquiring section and infer, in accordance with the image, a scene in which the specific mobile body device is located;
action determination processing in which the one or more processors determine a speech content, in accordance with the scene inferred, to be carried out by the specific mobile body device; and
action control processing in which the one or more processors control the specific mobile body device to output the speech content determined,
the mobile body control device further comprising:
an audio recognition section configured to detect, based on a voice of a user, a reaction, of the user, to the speech content output by the specific mobile body device; and
a reaction storage section,
wherein:
in the scene inference processing, the one or more processors identify objects in the image and infer a scene in accordance with a combination of the objects identified;
the one or more processors are configured to:
demarcate individual scenes on the basis of combinations of objects identified; and
control the reaction storage section to store positive and negative types of reactions, detected by the audio recognition section, in association with (i) the action corresponding to each reaction and (ii) a respective scene demarcated as above; and
in the action determination processing, the one or more processors refer to the types of reactions, which types are stored in the reaction storage section in association with a respective scene demarcated as above, and determine the speech content in accordance with (i) the types of reactions and (ii) the scene inferred.

2. The mobile body control device according to claim 1, wherein in the scene inference processing, the one or more processors identify objects in the image and infer a scene in accordance with a combination of the objects identified.

3. The mobile body control device according to claim 2, further comprising:
an association information storage section configured to store association information which indicates an association between an object and a scene,
wherein in the scene inference processing, the one or more processors refer to the association information and infer a scene in accordance with (i) a combination of the objects identified and (ii) the association information.

4. The mobile body control device according to claim 1, further comprising:
a position information acquiring section configured to acquire position information of the specific mobile body device,
wherein in the scene inference processing, in addition to referring to the image, the one or more processers further refer to the position information acquired by the position information acquiring section and infer a scene in accordance with the image and the position information.

5. The mobile body control device according to claim 1, wherein in the scene inference processing, the one or more processors infer, as the scene, a room in which the specific mobile body device is located.

6. The mobile body control device according to claim 1, further comprising:
a second association information storage section configured to store second association information which indicates an association between a scene and a speech to be carried out by the specific mobile body device,
wherein in the action determination processing, the one or more processors refer to the second association information and determine, in accordance with (i) the scene inferred and (ii) the second association information, the speech to be carried out by the specific mobile body device.

7. The mobile body control device according to claim 1, wherein:
in the action determination processing, the one or more processors determine speech content in accordance with the scene inferred; and
in the action control processing, the one or more processors control the specific mobile body device to output, as speech, the speech content determined.

8. The mobile body control device according to claim 1, wherein in the action determination processing, the one or more processors refer to time and date information and determine the speech content in accordance with (i) the time and date information and (ii) the scene inferred.

9. The mobile body control device according to claim 1, wherein the scene indicates a type of a location in which the mobile body device is situated.

10. The mobile body control device according to claim 1, wherein in the action determination processing, the one or more processors do not select a speech content which is associated with a negative type of reaction stored in the reaction storage section.

11. A computer-readable non-transitory recording medium on which a mobile body control program for a mobile body control device is stored, the mobile body control device including: an image acquiring section configured to acquire an image of a surrounding environment of a specific mobile body device; and one or more processors,
wherein the mobile body control program causes the one or more processors to carry out:
scene inference processing in which the one or more processors refer to the image acquired by the image acquiring section and infer, in accordance with the image, a scene in which the specific mobile body device is located;
action determination processing in which the one or more processors determine a speech content, in accordance with the scene inferred, to be carried out; and
action control processing in which the one or more processors control the mobile body device to output the speech content determined,
the mobile body control device further including:
an audio recognition section configured to detect, based on a voice of a user, a reaction, of the user, to the speech content output by the specific mobile body device; and
a reaction storage section,
wherein:
in the scene inference processing, the one or more processors identify objects in the image and infer a scene in accordance with a combination of the objects identified;
the one or more processors are configured to:
demarcate individual scenes on the basis of combinations of objects identified; and
control the reaction storage section to store positive and negative types of reactions, detected by the reaction detecting section, in association with (i) the action corresponding to each reaction and (ii) a respective scene demarcated as above; and
in the action determination processing, the one or more processors refer to the types of reactions, which types are stored in the reaction storage section in association with a respective scene demarcated as above, and determine the speech content in accordance with (i) the types of reactions and (ii) the scene inferred.

12. The computer-readable non-transitory recording medium according to claim 11, wherein the scene indicates a type of a location in which the mobile body device is situated.

13. The computer-readable non-transitory recording medium according to claim 11, wherein in the action determination processing, the one or more processors do not select a speech content which is associated with a negative type of reaction stored in the reaction storage section.

14. A method of controlling a mobile body, the method comprising the steps of:
(a) acquiring an image of a surrounding environment of a specific mobile body device;
(b) scene inference processing which involves referring to the image acquired and inferring, in accordance with the image, a scene in which the specific mobile body device is located;
(c) action determination processing which involves determining a speech content, in accordance with the scene inferred, to be carried out by the specific mobile body device;
(d) action control processing which involves controlling the specific mobile body device to output the speech content determined; and
(e) detecting, based on a voice of a user, a reaction, of the user, to the speech content output by the specific mobile body device,
wherein:
in the step (b), objects in the image are identified and a scene is inferred in accordance with a combination of the objects identified;
individual scenes are demarcated on the basis of combinations of objects identified;
positive and negative types of the reactions detected in the step (e) are stored in a reaction storage section in association with (i) the action corresponding to each reaction and (ii) a respective scene demarcated as above; and
in the step (c), the types of reactions, which types are stored in the reaction storage section in association with a respective scene demarcated as above, are referred to, and the action is determined in accordance with (i) the types of reactions and (ii) the scene inferred.

15. The method according to claim 14, wherein the scene indicates a type of a location in which the mobile body device is situated.

16. The method according to claim 14, wherein
in the step (c), a speech content which is associated with a negative type of reaction stored in the reaction storage section is not selected.

\* \* \* \* \*